United States Patent Office 3,420,789
Patented Jan. 7, 1969

3,420,789
POLYAMIDE RESINS HAVING SOLUBILITY AND RESISTANCE TO GETTING IN ALCOHOL SOLUTIONS
Alec Frank Wilson, London, England, assignor to Coates Brothers & Company Limited, London, England
No Drawing. Filed Feb. 11, 1963, Ser. No. 257,773
Claims priority, application Great Britain, Mar. 26, 1962, 11,389/62
U.S. Cl. 260—18    5 Claims
Int. Cl. C08g 20/00

It is known that polyamide resins may be produced by polycondensation reactions involving a variety of polymines and mixtures of mono and polyfunctional acids. The use of dibasic acids such as adipic and sebacic acids results in products which have high melting points and limited solubility. Products obtained using dimerized fatty acids have lower melting points and are soluble in certain aliphatic alcohols such as iso- and n-propanol. They show little solubility however in ethanol or industrial methylated spirits. Another disadvantages of these products is that solutions in the propanols form thixotropic gels on standing and often heat is required in order to destroy the gel structure. Although the tendency to gel is somewhat reduced by the use of an aliphatic alcohol-aromatic hydrocarbon solvent mix, the use of such a secondary solvent is often undesirable in a number of applications.

It has now been found that the use of itaconic acid as a replacement for part of the dimeric fatty acid results in the formation of products which are soluble in industrial methylated spirits, and solutions of these products in the lower aliphatic alcohols have a much reduced tendency to form thixotropic gels.

It is believed that the use of itaconic acid results in polymers which possess lactam linkages in addition to amide linkages, and that these are responsible for the improved solubility and reduced tendency to gel in alcohol solutions observed with the type of polymer so obtained. This is however not established and should not be regarded as limiting the invention in any way.

While it is possible to replace completely the dimer acid by itaconic acid, the most useful products are obtained when 2–50 mol percent of the total polycarboxylic acid is itaconic acid, a major proportion of the balance being dimer acid.

The products of the invention have in general a variety of useful properties. They are valuable components of varnishes, printing inks, heat seal compositions, adhesives, lacquers, paints, coatings for metal, wood, glass, plastics and rubber, especially those wherein a major proportion of the solvent used comprises one or more of the aliphatic alcohols.

The resins of the invention may be prepared by reacting a mixture of a polymerised (generally dimerized and/or trimerized) fatty acid and itaconic acid with an alpha-omega diprimary aliphatic diamine under conditions such as to promote polycondensation. The polymeric fatty acids used are polymers of unsaturated fatty acids (e.g. linoleic acid). They may be obtained in impure form i.e. mixed with monomeric acids, by hydrolysis of stand oils (unsaturated fatty oils which have been polymerized by heat). We prefer however to use the materials known commercially as "dimerized fatty acids" or "dimer acids." See Condensed Chemical Dictionary 6th ed. Reinhold (1961), p. 390. These contain litlte monomer but trimer and higher polymers are usually present in amounts up to 25%. Suitable dimer acids can be made by the method of U.S. Patent 2,482,761 but we do not limit our invention to polymeric fatty acids so made. The preferred polyamines are the primary polyamines of the aliphatic series, especially alpha omega diprimary aliphatic amines, including ethylene diamine, 1:3 propane diamine, tetramethylene diamine and hexamethylene diamine. Minor proportions of aromatic diamines may be incorporated such as the phenylene diamines and xylylene diamines, as may polyamines containing secondary amine groups such as diethylene triamine.

Minor proportions of certain aliphatic dicarboxylic acids may be incorporated in the formulations in place of part of the dimer acid and are particularly useful for obtaining products of higher melting point. The aliphatic dicarboxylic acids which prove satisfactory are those in which the carboxyl groups are separated by four or more carbon atoms, e.g. sebacic, pimelic, and azelaic acids.

Aliphatic dicarboxylic acids in which the carboxyl groups are separated by less than four carbon atoms act as chain terminating agents and can be employed as such.

Monofunctional acids which may be used for the control of molecular weight are saturated and unsaturated fatty acids and benzoic acid and its homologues. In addition certain anhydrides such as phthalic anhydride may be employed to control molecular weight as they terminate polymer chains through formation of an imide grouping.

Monofunctional amines which may be used for the control of molecular weight are typically ethylamine, butylamine, benzylamine, dodecylamine and the homologues.

The molecular weight may also be controlled by using a slight excess of amine or acid, this also promoting the solubility and non-gelatin characteristics of these products in alcoholic solvents. When the molecular weight is controlled in this way, it is preferred that the sum of the amine and acid values should not exceed 50 mg. KOH/g.

The following examples illustrate how the invention may be carried into effect.

The procedure adopted for the examples was as follows:

All the reactants except the itaconic acid and amine were charged into a three necked flask equipped with a thermometer, stirrer, nitrogen inlet, water cooled condenser and a dropping funnel.

The temperature was raised to 120–130° C. and the amine added slowly from the dropping funnel over a period of ½ hr., the temperature being kept at 120°–130° C. At the end of the addition the temperature was held at 130°–140° C. for a further ½ hr. and then the contents of the flask allowed to cool to 115° C. The itaconic acid was added and the temperature raised to 170° C. over ½–1 hr. and then to 220° C. over a further ½–1 hr. The temperature was held at 222° C. for a further 2 hrs. and then 2.1% of a phenolic antiskinning resin added. Vacuum was applied (100–125 min.) and the reaction continued for a further hour at the end of which the resin was cooled to 160° C. and discharged.

The solubility in 74 O.P. methylated spirit was assessed at 40% resin concentration. Further indication of alcohol solubility was obtained by diluting the 40% solution with a further quantity of 74 O.P. methylated spirit until precipitation occurred, and determining the solids content of the solution.

The degree of reaction was assessed by determination of acid and amine value, defined as the number of mg. KOH required to neutralise the free acidity present in 1 gram of the resin for the former and the number of mg. KOH equivalent to the quantity of acid required to neutralise the free basicity present in 1 gram of the resin for the latter. Melting or softening point was determined by the "ball and ring" method of I.P. 58/52.

| Example No. | Composition | Grams | Acid value, mg. KOH/g. | Amine value, mg. KOH/g. | M. pt., °C. | Solubility at 40% concentn. in 74 OP meth. spirit | Dilution with 74 OP meth. spirit |
|---|---|---|---|---|---|---|---|
| 1 | Dimer acid<br>Monomer acid<br>Itaconic acid<br>Ethylene diamine | 300<br>24<br>17.4<br>42.8 | 4.2 | 5.6 | 99 | Soluble | Soluble down to 35% solids. |
| 2 | Dimer acid<br>Monomer acid<br>Sebacic acid<br>Itaconic acid<br>Ethylene diamine | 250.8<br>24<br>4.8<br>26.2<br>42.8 | 2.9 | 3.7 | 96 | Soluble | Soluble down to 25% solids. |
| 3 | Dimer acid<br>Monomer acid<br>Sebacic acid<br>Itaconic acid<br>Ethylene diamine | 169.2<br>24<br>6.79<br>20.7<br>32.3 | 2.8 | 4.2 | 117 | Soluble | Soluble down to 15% solids. |
| 4 | Dimer acid<br>Monomer acid<br>Sebacic acid<br>Itaconic acid<br>Ethylene diamine | 150.4<br>24<br>13.6<br>20<br>31.9 | 7.0 | 2.1 | 131 | Soluble | Soluble down to 30% solids. |
| 5 | Dimer acid<br>Monomer acid<br>Sebacic acid<br>Itaconic acid<br>Ethylene diamine | 150.4<br>24<br>13.6<br>15<br>29.5 | 3.4 | 5.8 | 140 | Soluble | Soluble down to 25% solids. |
| 6 | Dimer acid<br>Monomer acid<br>Sebacic acid<br>Itaconic acid<br>Ethylene diamine | 338.4<br>48<br>13.6<br>43.3<br>65.6 | 5.6 | 8.4 | 111 | Soluble | Soluble down to 10% solids. |
| 7 | Dimer acid<br>Monomer acid<br>Azeleic acid<br>Itaconic acid<br>Ethylene diamine | 150.4<br>24<br>12.7<br>16.4<br>32.1 | 4.0 | 5.1 | 131 | Soluble | Soluble down to 15% solids. |
| 8 | Dimer acid<br>Monomer acid<br>Sebacic acid<br>Itaconic acid<br>Ethylene diamine | 169<br>24<br>6.8<br>43.6<br>42.8 | 5.0 | 6.1 | 107 | Soluble | Soluble at all concentns. |
| 9 | Dimer acid<br>Monomer acid<br>Itaconic acid<br>Ethylene diamine | 376<br>48<br>43.3<br>63.3 | 4.0 | 3.4 | 94 | Soluble | Soluble down to 22% solids. |
| 10 | Dimer acid<br>Acetic acid (glacial)<br>Itaconic acid<br>Ethylene diamine | 254.6<br>6.9<br>26.1<br>42.8 | 3.7 | 1.7 | 99 | Soluble | Soluble down to 20% solids. |
| 11 | Dimer acid<br>Acetic acid (glacial)<br>Itaconic acid<br>Ethylene diamine | 254.6<br>20.6<br>26.1<br>49.7 | 2.9 | 4.8 | 117 | Soluble | Soluble at all concentns. |
| High Amine Value version of Example (1) | | | | | | | |
| 12 | Dimer acid<br>Monomer acid<br>Itaconic acid<br>Ethylene diamine | 300<br>24<br>17.4<br>46.6 | 1.6 | 21.4 | 92 | Soluble | Soluble to 20% solids. |
| High Acid Value version of Example (1) | | | | | | | |
| 13 | Dimer acid<br>Monomer acid<br>Itaconic acid<br>Ethylene diamine | 300<br>24<br>17.4<br>39 | 16.5 | 1.6 | 93 | Soluble | Soluble down to 30% solids. |

In addition to the products being alcohol soluble they are less prone to gelation in alcohol solutions than the conventional dimer acid based polyamides.

Thus the product of Example 1 when dissolved in n-propanol (40% solids) formed a soft gel at 6° C. whilst at 12° C. the gel structure was completely destroyed. A typical commercial polyamide which was insoluble in 74 O.P. industrial methylated spirit dissolved in n propanol (40% solids) to form a system which resulted in a thixotropic gel at temperatures up to 24° C.

The expression "monomer acid" used herein, and in particular in Examples 1–9, 12 and 13, is understood by those versed in the art to refer to the various monomeric fatty acids such as those of sunflower, soya bean and ground nut oils. The particular monomer acid actually used in the quoted examples was the fatty acids of sunflower seed oil. Any of the other simple long chain monomeric fatty acids such as those of soya bean and ground nut oils could be used instead.

I claim:

1. A process for preparing a polyamide resin having solubility and resistance to gelling in alcohol solutions by polycondensation reaction between a polycarboxylic acid component comprising polymerized fatty acid and a polyamine, a major proportion of the polyamine being aliphatic promary polyamine, characterized in that the polycarboxylic acid component includes itaconic acid and the major proportion of the balance is polymerized fatty acid.

2. A process for preparing a polyamide resin having solubility and resistance to gelling in alcohol solutions by polycondensation reaction between a polycarboxylic acid component and a polyamine, a major proportion of the polyamine being aliphatic primary polyamine, characterized in that the polycarboxylic acid component consists essentially of a mixture of from 2 to 50% molar itaconic acid, and the major proportion of the balance is polymerized fatty acid.

3. A process according to claim 2 in which an excess of acid function is present in the reactants, such as to yield a total of acid and amine values not exceeding 50 mg. KOH/g.

4. A polyamide resin having solubility and resistance to gelling in alcohol solutions in which about 2 to 50% of the polycarboxylic acid residue is represented by itaconic acid and the major proportion of the balance is represented by polymerized fatty acid.

5. A composition of the varnish and printing ink class comprising an alcoholic solution of a resin as set forth in claim 4.

References Cited
UNITED STATES PATENTS

| | | | |
|---|---|---|---|
| 2,239,706 | 4/1941 | Epstein et al. | 260—404.5 |
| 2,641,593 | 6/1953 | Teeter et al. | 260—18 |
| 2,695,908 | 11/1954 | Wittcoff et al. | 260—18 |
| 2,739,871 | 3/1956 | Senkus | 260—404.5 |
| 2,767,089 | 10/1956 | Renfrew et al. | 260—18 |
| 2,886,543 | 5/1959 | Peerman et al. | 260—18 |
| 2,955,951 | 10/1960 | Aelony | 260—18 |
| 3,035,907 | 5/1962 | Halter et al. | 44—72 |
| 3,037,871 | 6/1962 | Floyd et al. | 260—404.5 |
| 3,140,566 | 7/1964 | Wagner. | |

DONALD E. CZAJA, *Primary Examiner.*

R. W. GRIFFIN, *Assistant Examiner.*

U.S. Cl. X.R.

106—27; 117—122, 124, 134, 139, 148, 167; 260—33.4, 404.5